(12) United States Patent
Castelli et al.

(10) Patent No.: US 7,272,593 B1
(45) Date of Patent: Sep. 18, 2007

(54) METHOD AND APPARATUS FOR SIMILARITY RETRIEVAL FROM ITERATIVE REFINEMENT

(75) Inventors: Vittorio Castelli, White Plains, NY (US); Chung-Sheng Li, Ossining, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,646

(22) Filed: Jan. 26, 1999

(51) Int. Cl.
*G06F 17/30* (2006.01)

(52) U.S. Cl. ............... 707/3; 707/5; 707/7; 707/10; 707/104.1

(58) Field of Classification Search ............ 345/431; 707/102, 10, 4, 101, 1–3, 5, 6, 104.1; 382/225, 382/154
See application file for complete search history.

(56) References Cited

U.S. PATENT DOCUMENTS

| | | | | |
|---|---|---|---|---|
| 5,493,677 A | * | 2/1996 | Balogh et al. | 707/4 |
| 5,692,181 A | * | 11/1997 | Anand et al. | 707/3 |
| 5,734,893 A | * | 3/1998 | Li et al. | |
| 5,781,906 A | * | 7/1998 | Aggarwal et al. | 707/102 |
| 5,809,297 A | * | 9/1998 | Kroenke et al. | 707/2 |
| 5,832,182 A | * | 11/1998 | Zhang et al. | |
| 5,845,278 A | * | 12/1998 | Kirsch et al. | 707/3 |
| 5,852,823 A | * | 12/1998 | De Bonet | 707/6 |
| 5,893,101 A | * | 4/1999 | Balogh et al. | 707/100 |
| 5,963,940 A | * | 10/1999 | Liddy et al. | 707/5 |
| 5,970,499 A | * | 10/1999 | Smith et al. | 707/104 |
| 5,983,237 A | * | 11/1999 | Jain et al. | 707/104.1 |
| 5,987,446 A | * | 11/1999 | Corey et al. | 707/3 |
| 6,026,388 A | * | 2/2000 | Liddy et al. | 707/1 |
| 6,084,595 A | * | 7/2000 | Bach et al. | 345/431 |
| 6,134,541 A | * | 10/2000 | Castelli et al. | 707/2 |
| 6,175,829 B1 | * | 1/2001 | Li et al. | 707/3 |
| 6,233,578 B1 | * | 5/2001 | Machihara et al. | 707/10 |
| 6,298,342 B1 | * | 10/2001 | Graefe et al. | 707/4 |

* cited by examiner

*Primary Examiner*—Cam Y T Truong
(74) *Attorney, Agent, or Firm*—Anne Vachon Dougherty

(57) ABSTRACT

An iterative refinement algorithm for content-based retrieval of images based on low-level features such as textures, color histograms, and shapes that can be described by feature vectors. This technique adjusts the original feature space to the new application by performing nonlinear multidimensional scaling. Consequently, the transformed distance of those feature vectors which are considered to be similar is minimized in the new feature space. Meanwhile, the distance among clusters are maintained. User feedback is utilized to refine the query, by dynamically adjusting the similarity measure and modifying the linear transform of features, along with revising the feature vectors.

5 Claims, 12 Drawing Sheets

401
Identify cluster(s) which are likely to include the vector

402
Apply appropriate parameter to indices for high-dimensional index

403
Select N candidates from those cluster(s) which have closest distance from the vector

Figure 4:

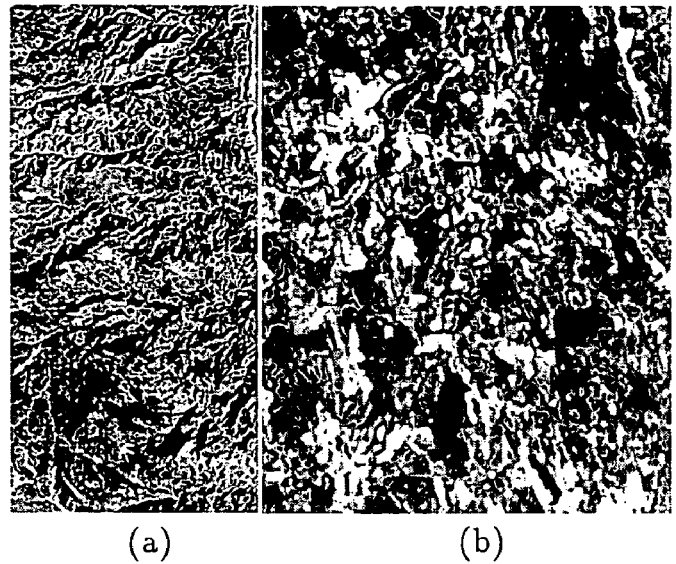
Figure 7: Satellite images of (a) mountain (b) mixed area.
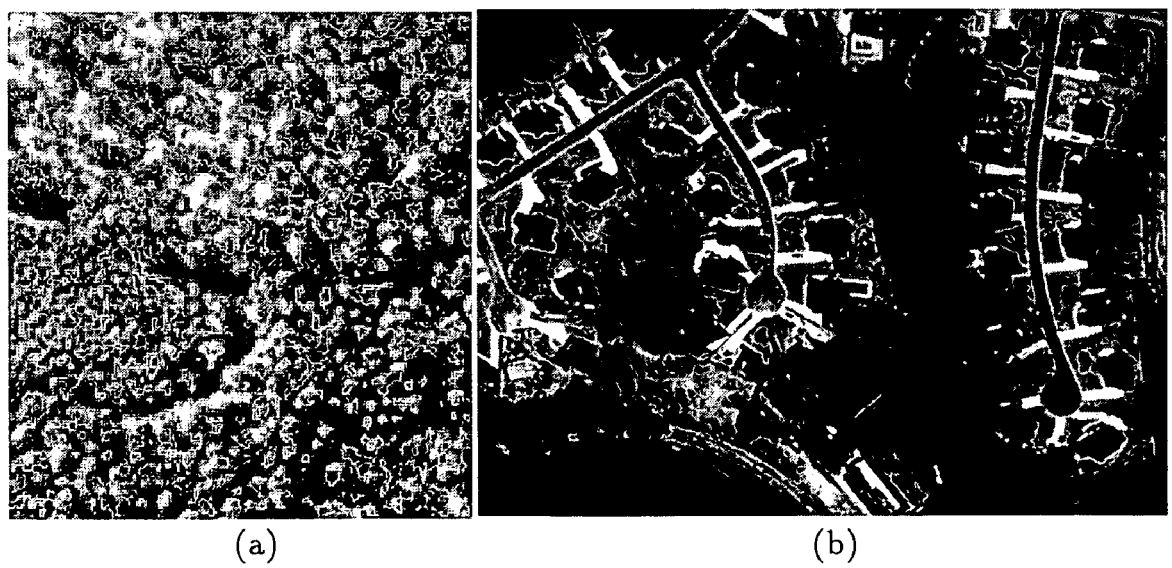
Figure 8: Satellite images of (a) forests (b) suburbs.

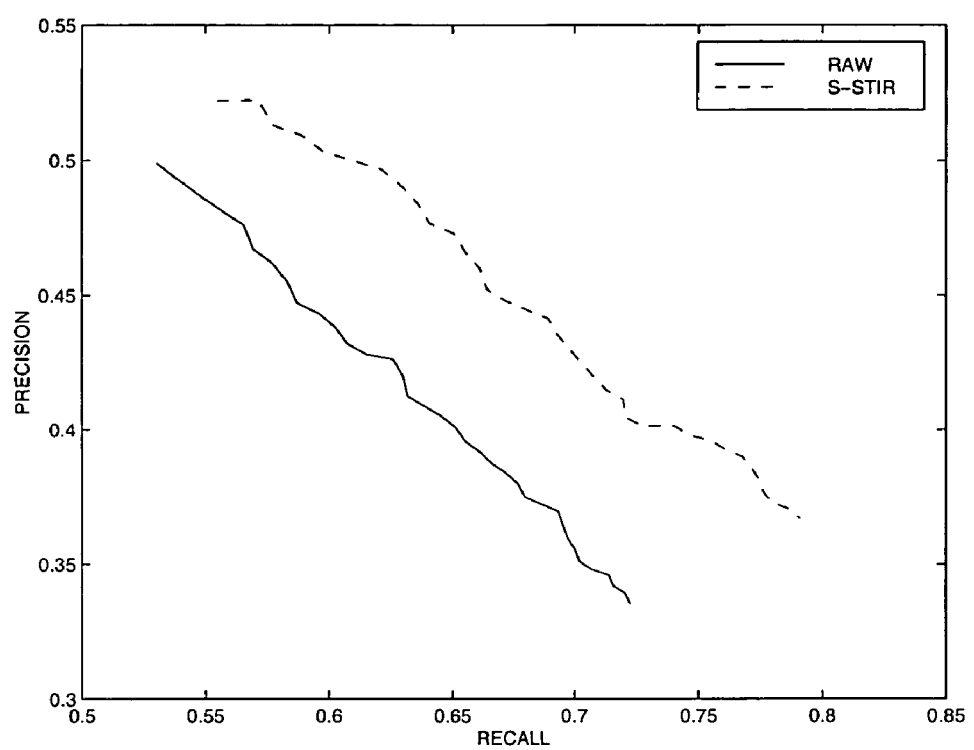
Figure 9: Comparison of precision versus recall for raw feature vector and feature vectors transformed by S-STIR algorithm.

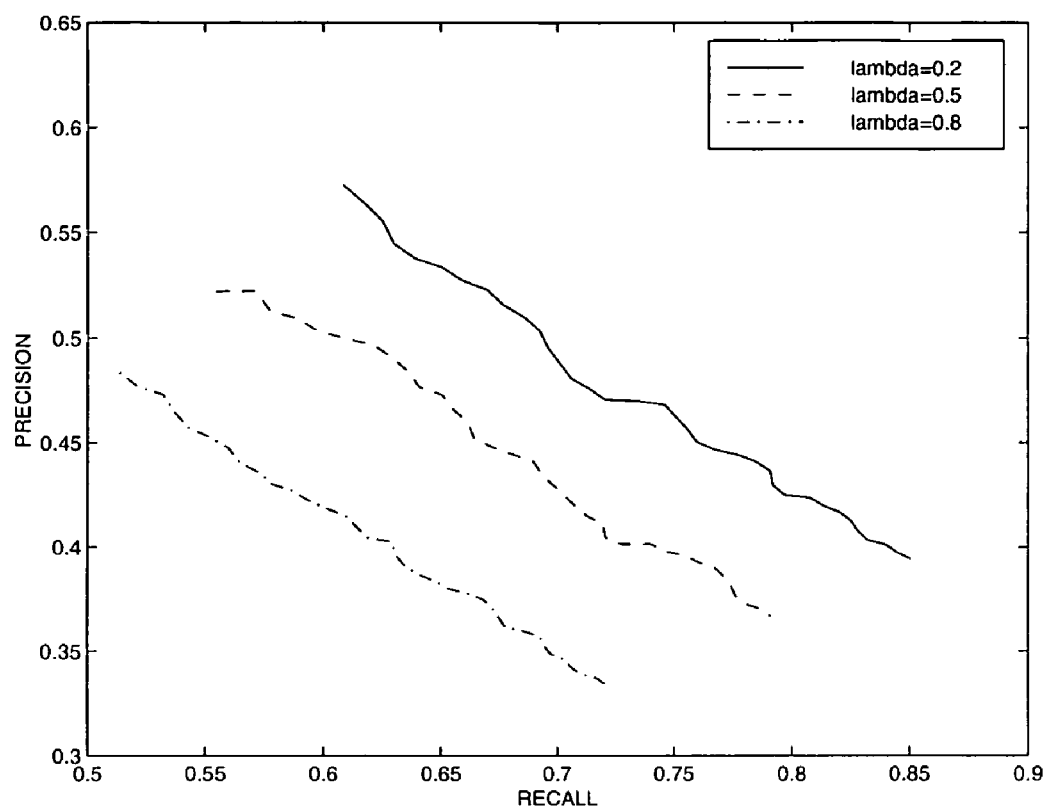
Figure 10: Effect on the precision versus recall for different values of $\lambda$.

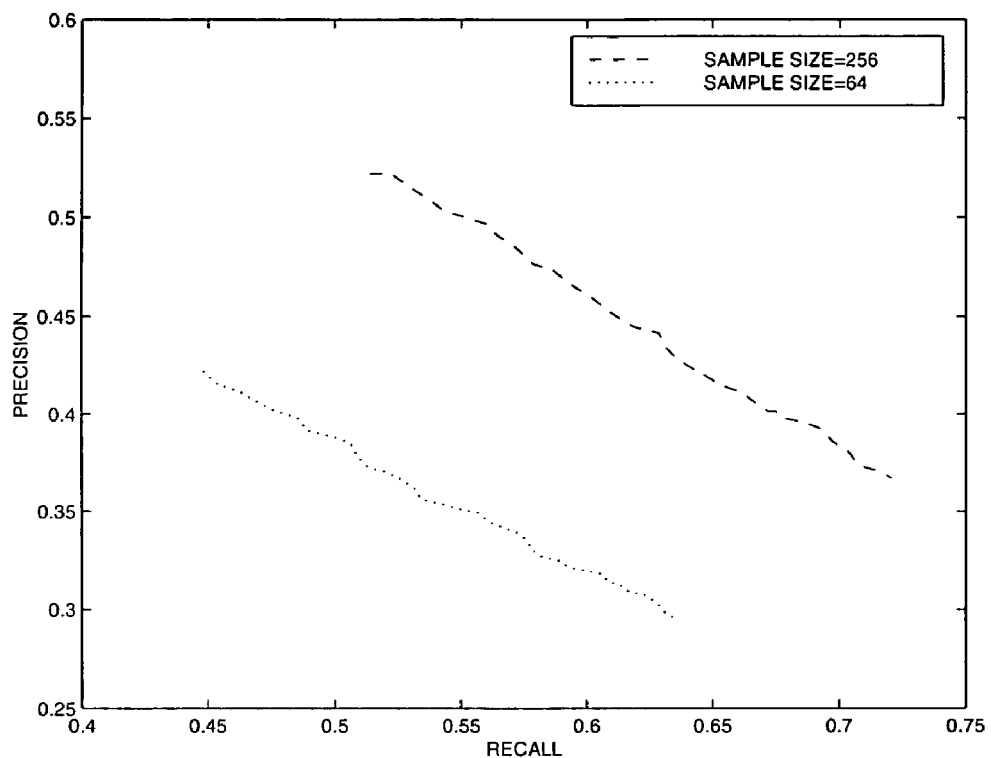
Figure 11: Effect on the precision versus recall for different values of sample size.

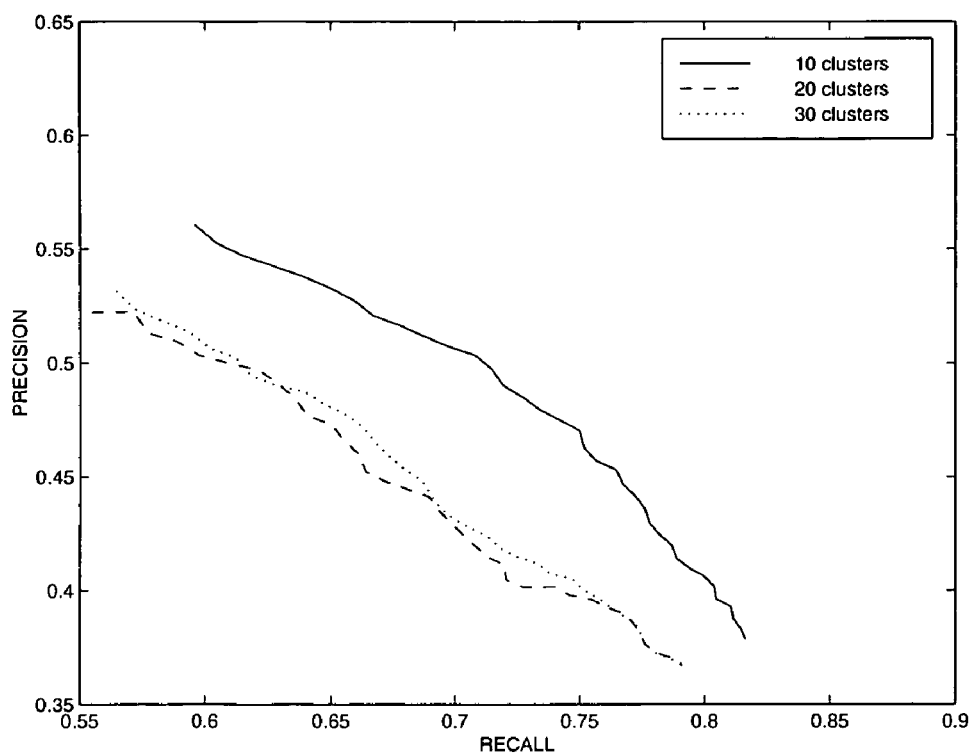
Figure 12: Effect on the precision versus recall for different number of clusters.

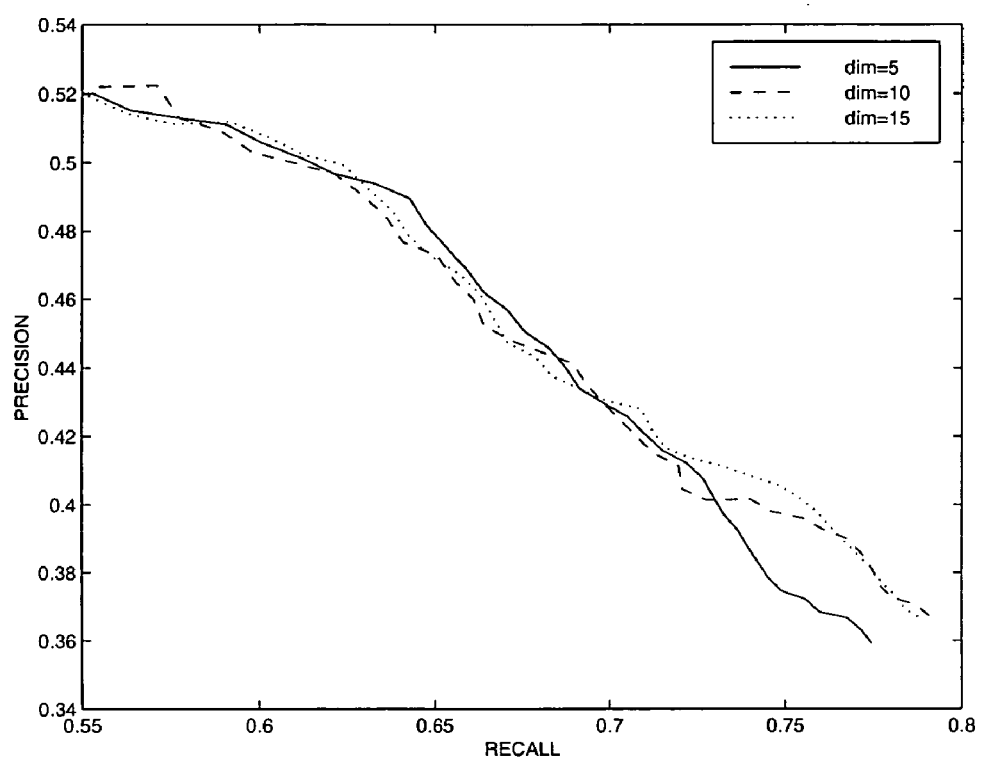
Figure 13: Effect on the precision versus recall for different values of final dimensionality.

METHOD AND APPARATUS FOR SIMILARITY RETRIEVAL FROM ITERATIVE REFINEMENT

FIELD OF THE INVENTION

The present invention relates generally to improved information retrieval systems for images and other nonstructure data. Particular aspects of the present invention are related to (1) adjusting the similarity measure for comparing the target and the objects in the information systems by taking advantage of user feedback, while (2) maintaining the efficiency of the retrieval system.

BACKGROUND OF THE INVENTION

Recent methods for retrieving images and videos by content from large archives utilize feature descriptors and feature comparison metrics in order to index the visual information. Examples of such content-based retrieval systems include the IBM Query by Image Content (QBIC) system, detailed in "Query by image and video content: The {QBIC} system," by M. Flickner, et al, "IEEE Computer", 28(9):23-32, (September 1995); the Virage visual information retrieval system, detailed in "Virage image search engine: an open framework for image management," by J. R. Bach, et al, "Symposium on Electronic Imaging: Science and Technology—Storage & Retrieval for Image and Video Databases {IV}", volume 2670, pages 76-87, (1996); the MIT Photobook, detailed in "Tools for content-based manipulation of image databases," by A. Pentland, et al, "Proceedings of the SPIE Storage and Retrieval Image and Video Databases II" (February 1994); the Alexandria project at UCSB detailed by B. S. Manjunath and W. Y. Ma, in "Texture features for browsing and retrieval of image data," in the "IEEE Trans. Pattern Analysis Machine Intell. Special Issue on Digital Libraries", Vol. 8 (1996), and by M. Beatty and B. S. Manjunath in "Dimensionality reduction using multidimensional scaling for image search," published in the "Proc. IEEE International Conference on Image Processing" (October 1997); and, the IBM/NASA Satellite Image Retrieval System, detailed in "Progressive content-based retrieval from distributed image/video databases," by V. Castelli, et al, "Proceeding of the International Symposium of Circuit and System" (1997).

In the prior art systems, the feature comparison between the search target and those feature vectors stored in the database is typically based upon a simple fixed metric, such as the Euclidean distance or the quadratic distance (see: "Visualseek: A fully automated content-based image query system," by J. R. Smith and S. F. Chang in the "Proc. International Conference on Image Processing" (1996). While these simple metrics may minimize the computational requirements for feature comparison, they typically do not correspond well to human perceptual distance nor do they have the capabilities to adapt to the changing environment commonly arising in various scientific applications. Specifically, it is desirable to provide a system and method that can accommodate the following diverse requirements:

Retrieving Synthetic Aperture Radar (SAR) Satellite images and identifying regions in the images with texture (e.g., ice) type similar to the search target;

Retrieving one-meter resolution satellite images and identifying regions in the images with spectral features (e.g., crop type) similar to the search target;

Retrieving LANDSAT Thematic Mapper™ satellite images and identifying regions in the images with a combination of spectral and texture features (e.g., indicative of similar terrain type) which are similar to the search target.

The foregoing feature comparisons may be implemented for the following applications:

Environmental epidemiology: wherein the system seeks to retrieve locations of houses which are vulnerable to epidemic diseases such as Hantavirus and Denge fever based on a combination of environmental factors (e.g. isolated houses that are near bushes or wetlands), and weather patterns (e.g. a wet summer followed by a dry summer);

Precision farming: wherein it is desirable to (1) retrieve locations of crop developments that are exposed to diseases, (for example: clubroot, which is a soil-borne disease that infects cauliflower crop). Cauliflower and clubroot have recognized spectral signatures, and exposure results from their spatial and temporal proximity; (2) retrieve those fields which have abnormal irrigation; or, (3) retrieve those regions which have higher than normal soil temperature;

Precision forestry: wherein the system may seek to (1) calculate areas of forests that have been damaged by hurricane, forest fire, or storms, and (2) estimate the amount of the yield of a particular forest;

Petroleum exploration: to retrieve those regions which exemplify specific characteristics in the collection of seismic data, core images, and other sensory data;

Insurance: for which a system may be called upon to (1) retrieve those regions which may require immediate attention due to natural disasters such as earthquake, forest fire, hurricane, and tornadoes; or (2) retrieve those regions have higher than normal claim rate (or amount) that are correlated to the geography—close to coastal regions, close to mountains, in high crime rate regions, etc.;

Medical image diagnosis: for retrieval of all MRI images of brains that have tumors located within the hypothalamus, where such tumors are characterized by shape and texture, and the hypothalamus is characterized by shape and spatial location within the brain;

Real estate marketing: wherein the system may be required to retrieve all houses that are near a lake (color and texture), have a wooded yard (texture) and are within 100 miles of skiing (mountains are also given by texture); and Interior design: for use in retrieving all images of patterned carpets which consist of a specific spatial arrangement of color and texture primitives.

There are some fundamental problems that are related to similarity search tasks, including the following:

(1) Different similarity measures capture different aspects of perceptual similarity between images. When similarity retrieval is used for applications such as environmental epidimeology or medical diagnosis, each task might impose a different similarity measure. Ultimately, similarity measure is tied to the tasks it needs to perform.

(2) Different features have unequal contribution to the relevance of the computations of the similarity measure. When two images are regarded as similar, they ma be similar in terms of one of more of the subsets of the features. Incomplete specification of the query-as the similarity queries are usually difficult to completely specify due to the limitations of the user interface. Consequently, the system needs to interact with the user in order to learn from the user what the user really means.

In order to improve the results from feature comparison, the aforementioned VisualSEEk project at Columbia University and the Alexandria project have developed linear transformations of texture feature spaces. These approaches use fixed transformations of the feature space based on a linear transformation determined by a predefined training set. Noted that both of the database and the query will have to go through the same transformation. Unfortunately, this approach does not allow for adaptation of incremental user feedback, and thus cannot take advantage of the additional query-specific knowledge which can be provided by the user.

Research on relevance feedback for textual database systems has focused on adaptively refining a user's initial query to more accurately select the desired data. This is usually an iterative refinement process in which the user indicates the relevance or irrelevance of the retrieved items. While relevance feedback has been extensively studied in textual retrieval, there has been little investigation of its use for image retrieval. An approach towards applying this technique to an image database had been proposed (see: "Interactive Learning through a Society of Models", by T. P. Minka, et al, Technical report 349, MIT Media Lab, 1995). In the approach taught therein, the system forms disjunctions between initial image features groupings according to both positive and negative feedback given by the users. A consistent grouping is found when the features are located within the positive examples. A different approach was later proposed by one of the authors, leading to the development of PicHunter as detailed by I. J. Cox, et al, in "Pichunter: Bayesian relevance feedback for image retrieval," published in the "Proceeding of the International Conference on Pattern Recognition", pages 361-369. {IEEE}, 1996 and in "An Optimized Interactive Strategy for Bayesian Relevance Feedback," SPIE Photonics West, San Jose, 1998.) In PicHunter, the history of user selection is used to construct system's estimate of the user's goal image. A Bayesian learning system based on a probabilistic model of the user behavior is combined with user selection to estimate the probability of each image in the database. Instead of revising the queries, PicHunter tries to refine the answers in reply to user feedback. Alternatively, an approach has also been proposed to learn both feature relevance and similarity measure simultaneously. (see: "Learning Feature Relevance and Similarity Metrics in Image Databases," by Shanu, et al, "IEEE Computer Vision and Pattern Recognition," June 1998.) In this approach, the local feature relevance is computed from a least-square estimate, and a connectionist reinforcement learning approach has been adopted to iteratively refine the weights.

All of these methods definitely provide some improvement in image retrieval performance. However, there is a lack of a flexible framework that can allow the incremental revision of the query (for a given context), the similarity measure, the relevance of individual features, and the entire feature space simultaneously. Furthermore, these systems do not take into account the simultaneous efficient indexing in a high-dimensional feature space, which is commonly required for the above-mentioned applications. Multidimensional indexing is fundamental to spatial databases, which are widely applicable to Geographic Information Systems (GIS), Online Analytical Processing (OLAP) for decision support using a large data warehouse, and multimedia databases where high-dimensional feature vectors are extracted from the image and video data.

Multidimensional indexes can be used to answer different types of queries, including:

finding record(s) with specified values of the indexed columns (exact search);

finding record(s) that are within [a1 . . . a2], [b1 . . . b2], . . . , [z1 . . . z2] where a, b and z represent different dimensions (range search); and finding the k most similar records to a user-specified template or example (k-nearest neighbor search).

During the execution of a database query, the database search program accesses part of the stored data and part of the indexing structure; with the amount of data accessed depending upon the type of query and upon the data provided by the user, as well as upon the efficiency of the indexing algorithm. Generally, large databases are configured such that the data and at least part of the indexing structure reside on the larger, slower and cheaper part of the memory hierarchy of the computer system, usually consisting of one or more hard disks. During the search process, part of the data and part of the indexing structure are loaded in the faster parts of the memory hierarchy, such as the main memory and one or more levels of cache memory. The faster parts of the memory hierarchy are generally more expensive and thus comprise a smaller percentage of the storage capacity of the memory hierarchy A program that uses instructions and data that can be completely loaded into one or more levels of cache memory is faster and more efficient than a process that in addition uses instructions and data that reside in the main memory, which in turn is faster than a program that also uses instruction and data that reside on the hard disks. Technological limitations are such that the cost of cache and main memory makes it too expensive to build computer systems with enough main memory or cache to completely contain large databases.

Thus, there is a need for an improved technique for indexing image and other nonstructure data, which technique generates indexes of such size that most or all of the index can reside in main memory at any time; and that limits the amount of data to be transferred from the disk to the main memory during the search process.

Several well known spatial indexing techniques, such as R-trees can be used for range and nearest neighbor queries. Descriptions of R-trees can be found, for example, in "R-trees: A Dynamic index structure for spatial searching," by A. Guttman, "ACM SIGMOD Conf. on Management of Data", Boston, Mass. (June, 1994). The efficiency of these techniques, however, deteriorates rapidly as the number of dimensions of the feature space grows, since the search space becomes increasingly sparse. For instance, it is known that methods such as R-Trees are not useful when the number of dimensions is larger than 8, where the usefulness criterion is the time to complete an indexed search request compared to the time required by a simple strategy that would complete the request by sequentially analyzing every record in the database. The inefficiency of the usual indexing techniques in high dimensional spaces is the consequence of a well-known phenomenon called the "curse of dimensionality," which is described, for instance, in "From Statistics to Neural Networks," NATO ASI Series, vol. 136, Springer-Verlag, 1994, by V. Cherkassky, J. H. Friedman, and H. Wechsles. The relevant consequence of the curse of dimensionality is that clustering the index space into hypercubes is an inefficient method for feature spaces with a higher number of dimensions.

Because of the inefficiency associated with using existing spatial indexing techniques for indexing a high-dimensional feature space, techniques well known in the art exist to reduce the number of dimensions of a feature space. For example, the dimensionality can be reduced either by variable subset selection (also called feature selection) or by singular value decomposition followed by variable subset selection, as taught, for instance by C. T. Chen, *Linear System Theory and Design*, Holt, Rinehart and Winston, Appendix E, 1984. Variable subset selection is a well known and active field of study in statistics, and numerous methodologies have been proposed (see e.g., "An Optimal Selection of Regression Variables" by Shibata, et al, "Biometrika", vol. 68, No. 1, pp. 45-54, 1981). These methods are effective in an index generation system only if many of the variables (columns in the database) are highly correlated. Such a correlation assumption, however, cannot generally be made for real world databases. Consequently, there is a need for techniques that allows incremental revision of the user query or feature space based on the user feedback, while supporting efficient indexing in a high dimensional feature space.

SUMMARY OF THE INVENTION

The foregoing and other objectives are realized by the present invention comprising an improved apparatus and method for revising feature vectors according to relevance feedback from the user, and for revising the searchable multidimensional indexes in databases. The present invention has features for flexibly generating the indexes and for efficiently performing exact, as well as nearest neighbor, searches. The present invention provides a mechanism for the user to dynamically adjust the similarity measure. The experimental results show that a significant improvement on the "precision versus recall" curve has been achieved.

In accordance with the invention, an algorithm enables the revision of feature and metric transformations based upon interaction with the user in the retrieval process. This algorithm is based upon nonlinear multidimensional scaling (MDS) that refines the feature space based upon the user's evaluation of the retrieval results. In this inventive algorithm, the linear transform of the features is modified by the user's feedback. Furthermore, a deepest gradient decent process is developed to enable fast convergence of the matrix, which makes the method suited to the interactive query environment. Since this method is also consistent with the method for building multidimensional index, the transformation of the feature space does not affect the indexing efficiency.

An example of a method for generating indexes having features of the present invention includes the steps of: (1) initial retrieval of feature vectors that are "similar" to the specification of the user query; (2) user input specifying the quality of the returned results (in the simplest case, the user indicates whether a retrieved result is similar or not similar); (3) system revision of the query, the feature space, or both, so that the retrieved results are more in line with the user's expectation; and (4) iteration of steps (2) and (3) until the user is completely satisfied. In order to allow simultaneous adaptation of the query and the feature space in step (3), this invention utilizes a method based on extensions of nonlinear multi-dimensional scaling. In step (1), similarity searches are performed on a multidimensional index created in accordance with the foregoing method for generating and refining indexes. A similarity search can include the steps of: finding the cluster to which specified data (such as a user-provided example or a template record) belongs; searching the efficient searchable index generated for the reduced-dimensionality version of the cluster to which the specified data belongs; retrieving via the searchable index, the k most similar elements of the cluster, assessing if other clusters can contain elements that are closer to the specified data than the farthest of the k most similar elements retrieved; searching the closest such cluster to the specified data; and repeating the last two steps until no further cluster exists that can contain elements that are closer to the specified data than the farthest of the k most similar elements retrieved.

A straight forward application of nonlinear multidimensional scaling (or multidimensional scaling), however, will destroy the capability of utilizing existing methods for similarity retrieval based on pre-computed high-dimensional indexes. This invention addresses this issue by sharing the nonlinear transformation used for building the index when adapting the feature space. Consequently, the feature space adaptation in the learning stage only involves linear transformation. It is thus possible to utilize the same precomputed high-dimensional index structure, thus achieving higher retrieval performance.

BRIEF DESCRIPTION OF THE DRAWINGS

These and other features and advantages of the present invention will become apparent from the following detailed description, taken in conjunction with the accompanying drawings, wherein:

FIG. 4 shows the flowchart for performing similarity search in the inventive cluster-based feature vector index;

FIG. 7 shows two examples of satellite images used in the benchmark;

FIG. 8 shows two more examples of satellite images used in the benchmark;

FIG. 9 shows comparison of precision versus recall for raw feature vector and feature vectors transformed by the inventive iterative refinement algorithm;

FIG. 10 shows the effect on the precision versus recall for different values of the parameter;

FIG. 11 shows the effect on the precision versus recall for different values of sample size;

FIG. 12 shows the effect on the precision versus recall for different number of clusters; and FIG. 13 shows the effect on the precision versus recall for different values of final dimensionality.

DETAILED DESCRIPTION

Figure 1:
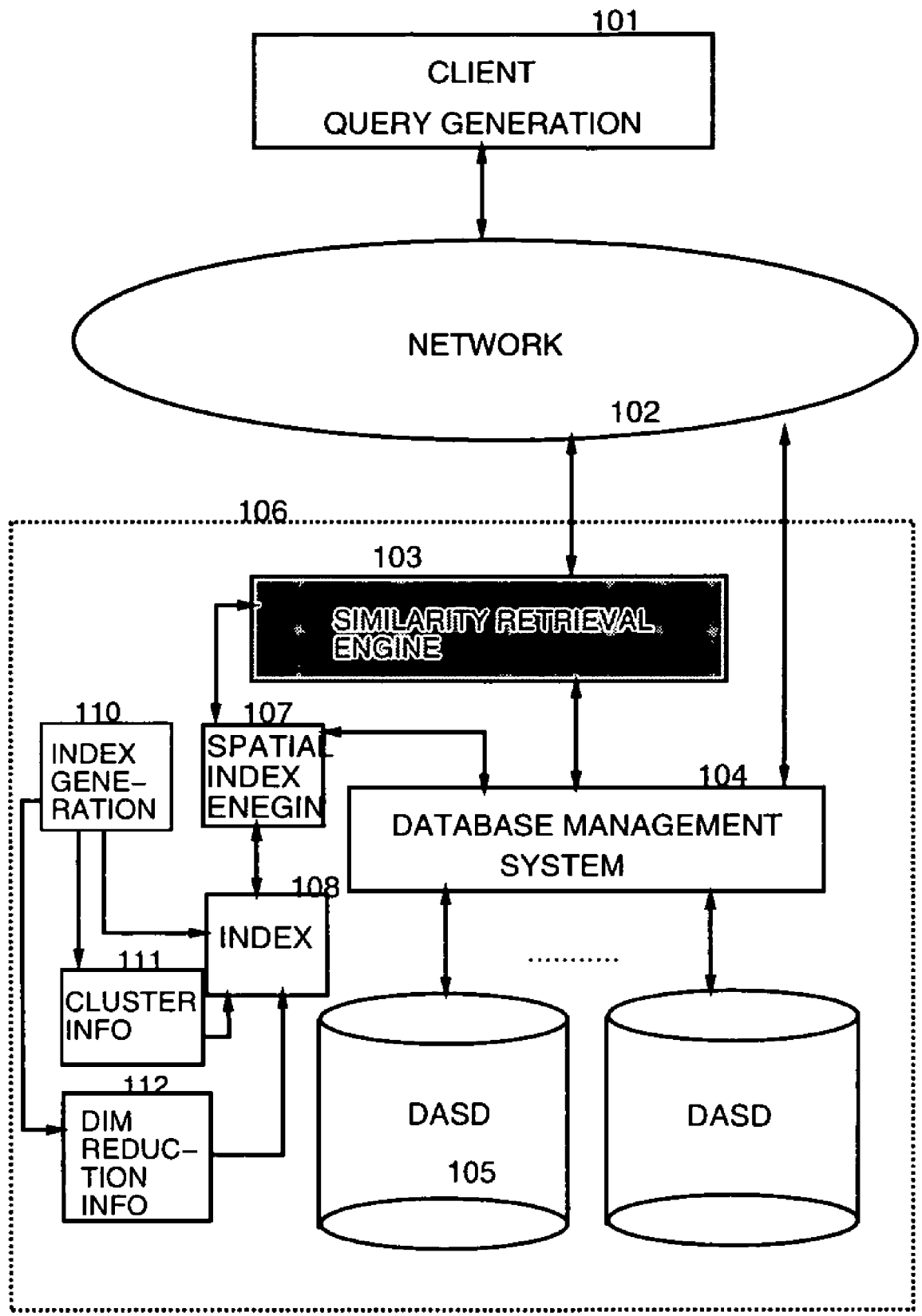
FIG. 1 shows an example of a block diagram of a networked client/server system.

FIG. 1 depicts an example of a client/server architecture having features of the present invention. As depicted, multiple clients (101) and multiple servers (106) are interconnected by a network (102). The server (106) includes one or more conventional database management systems (DBMS) (104) and one or more direct access storage devices (DASD) (105). A query is typically prepared on the client (101) machine and submitted to the server (106) through the network (102). Such queries are usually based on similarity search (or nearest neighbor search) and are processed by the similarity query engine (103). The similarity query engine interacts with a database management system (DBMS) (104) for retrieving or updating a database stored in the DASD (105). Those similarity based (or nearest neighbor based) queries needing multidimensional (e.g., spatial) indexing, including range queries and nearest neighbor queries, will invoke the multidimensional indexing engine (107). Those skilled in the art will appreciate that a database, such as a spatial database, can reside on one or more systems, and that the multidimensional indexing engine (107) can be incorporated as part of the DBMS (104). The multidimensional indexing engine (107) is responsible for retrieving those vectors or records which satisfy the constraints specified by the query based on one or more compact multidimensional index files (108) generated in accordance with the present invention and preferably stored in the main memory and/or cache of the server (106).

As an example, the database can store satellite images, medical images, seismic data, and time series. Such multimedia data such as audio, video and images can be stored separately from the metadata used for indexing. One key component of the metadata that can be used for facilitating the indexing and retrieval of the media data are feature vectors extracted from the raw data. For example, texture, color histogram and shape can be extracted from regions of the image and be used for constructing indices for retrieval.

In general, indexes can be generated by first creating a representation of the database to be indexed as a set of vectors, where each vector corresponds to a row in the database and the elements of each vector correspond to the values, for the particular row, contained in the columns for which an index must be generated.

Creating a representation of the database as a set of vectors is well known in the art. The representation can be created by, but is not limited to, the steps of creating for each row of the database an array of length equal to the dimensionality of the index to be generated; and copying to the elements of the array, the values contained in the columns, of the corresponding row, for which the index must be generated.

It is assumed that an image database consists of a set of N feature vectors. Each feature vector has n dimensions. The feature vectors potentially represent a combination of, for example, color, texture and shape information. A query is started by presenting a query feature vector to the system. Consider that the feature vector may correspond to a particular query image, region or object. Initially, the K best matches are retrieved using a Euclidean metric. For two n-dimensional feature vectors, the most commonly used similarity measure between two vectors, u and v, is the Euclidean distance measure, d, defined as $$d^2 = \sum_{i=1}^{n} (u_i - v_i)^2 \quad (1)$$

where $u=[u_1, \ldots, u_n]^T$ and $v=[v_1, \ldots, v_n]^T$.

The K results whose feature vectors are closest to the target feature vectors are then returned to the user for visual inspection or further processing.

The similarity between the retrieved results and the target object (such as image, image region, a segment of time series, etc.) measured by the Euclidean distance, however, does not necessarily correspond to the relative similarity perceived by the human being or required by the application. Consequently, at least one of the following actions need to be taken:

Query reformulation: Content-based retrieval systems can use image clip to find "all images with features similar to the clip". In this case, the features extracted from the example will be used as the initial query. The reformulated query could contain a feature vector which is derived from a set of examples and counterexamples provided by the user. Note that different iterations of the user feedback may have different weights in calculating the "composite queries";

Feature relevance weighting: The relevance of each individual feature can be derived from the examples, counterexamples, and user interactions with the system. One possible way of producing the weight is to examine the distribution of each feature in the examples and counterexamples. If the distribution is small, with respect to the overall distribution, then the feature is potentially relevant. On the other hand, if the distribution is large asc compared to the overall distribution, then the feature is probably not going to be discriminating for the particular example;

Feature space warping: This approach performs either linear or nonlinear transformation of the feature space so that Euclidean distance in the resulting feature space corresponds more closely with the relative similarity perceived by the human being or required by the applications. In the linear transformation case, the Euclidean distance between the vectors in the warped feature space is $\|M(u-v)\|$, where M is the linear transformation; and Generalized distance metric: This approach utilizes a similarity measure such as the quadratic form $d(u,v)=(u-v)^T Q(u-v)$ where u and v have been defined earlier. Note that the this metric can be formulated as a special case for the metric $d(u,v)=\|M(u-v)\|$ of feature space warping, providing that the matrix Q can be decomposed into $M^T M$.

The performance of the retrieval is measured in terms of precision and recall, defined below. Let X be a template, $n_X$ be the number of matches in the database, and $n_Q$ be the requested number of results. The query returns $N_C(X, n_Q)$ of the $n_X$ matches, where $N_C(X, n_Q) \leq \min\{n_Q, n_X\} \leq \min\{n_Q, n_X\}$. In the following definitions, let n Q be fixed, and let $E_X[\bullet]$ denote the expectation with respect to X:

Precision, $R_E$: This is the proportion of the retrieved results that are relevant. For each template X, define $R_E(X, n_Q)=N_C(X, n_Q)/n_Q$. Then, $R_E(n_Q)=E_X[R_E(X, n_Q)]=E_X[N_C(X, n_Q)/n_Q]$ Recall, $R_A$: This is the proportion of the relevant results that are retrieved. For each template X let $R_A$ (X, n)=$N_C(X, n)/\min\{n_X, n\}$ be the proportion of correct results in a retrieved set of size n. Then, $R_A(n_Q)=E_X[R_A(X, n_Q)]=E_X[n_C(X n_Q)/\min\{n_X, n_Q\}$ Both $R_E(NQ)$ and $R_A(n_Q)$ are estimated in the experiments by sample averages, and precision versus recall plots for each template X are obtained by varying n outside the range [0, $n_X$] where $R_E=R_A$.

The goal of the iterative refinement process is to discover the best transformation such that the set of vectors in the desired class has minimum separation while the distance between those vectors in different classes is preserved or maximized.

Figure 2:
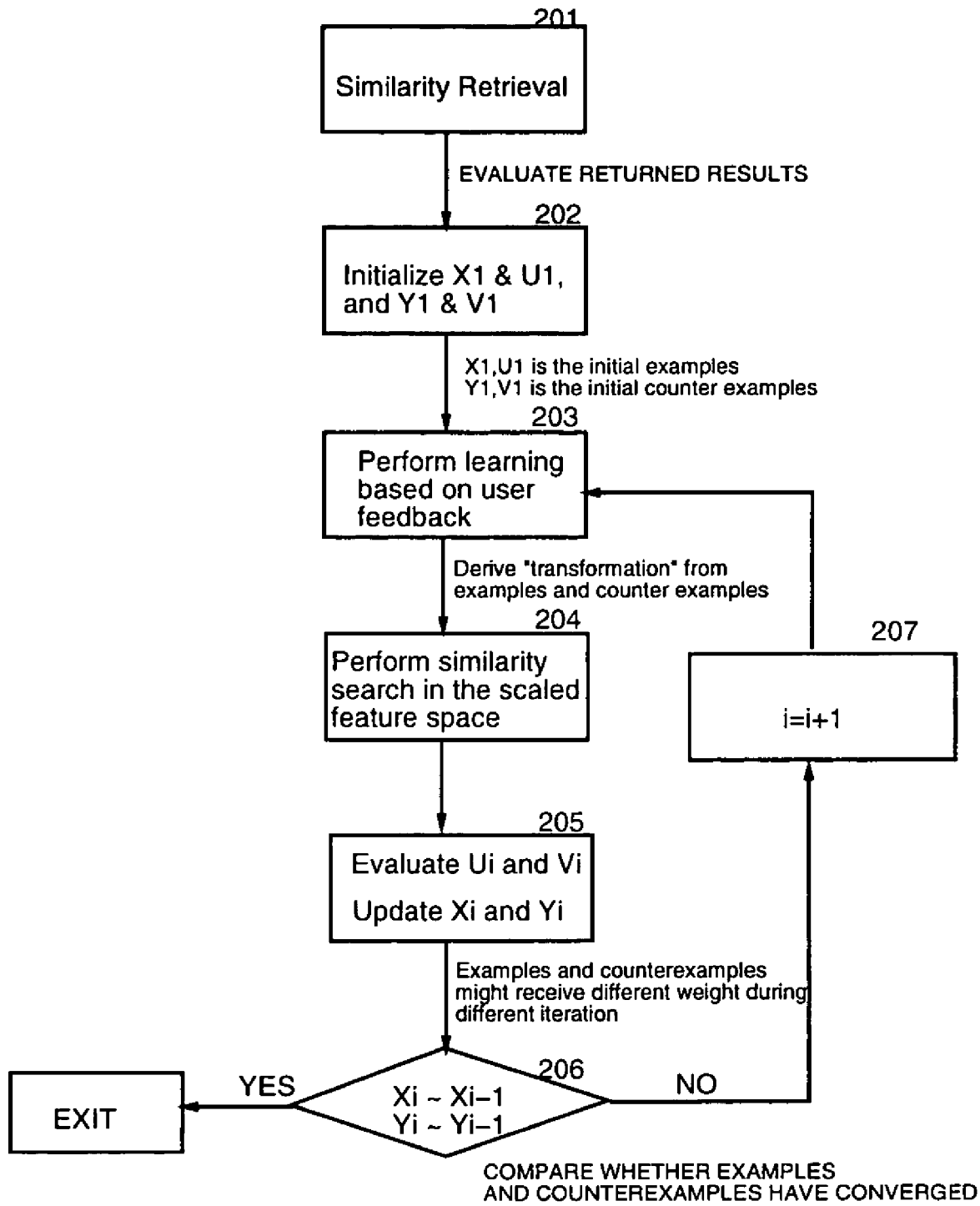
FIG. 2 shows the flowchart for the inventive similarity retrieval with relevance feedback.

FIG. 2 shows the flowchart for the basic iterative refinement algorithm. The basic idea of iterative refinement is that the user selects $L_1$ of the K matches that are most similar to the desired match and reissues the query. Based upon this feedback, the linear or nonlinear transform matrix is modified to better approximate the user's evaluation of similarity. Then, a second set of matches is found and is returned to the user. The user selects the $L_2$ best matches and again reissues the query. This process is repeated until either the result set converges, or the user stops the process.

If the set of the feature vectors selected by the user up to step i−1 is denoted as $X_{i-1}$ then $X_i = X_{i-1} \cup U_i$, where $U_i$ is the set of feature vectors selected during step i. The set of vectors that are NOT selected up to step i−1 is $Y_{i-1}$, then $Y_i = Y_{i-1} \cup V_i$ where $V_i$ is the set of feature vectors rejected during step I.

What the inventive iterative refinement algorithm provides is the following: simultaneous provision of adaptation of the query, similarity measure, feature space and relevance weighting based on the interactions between the user and retrieved results over one or more iterations; and accounting for the high-dimensional indices associated with the feature vector database so that the same indices can be applied regardless of the adaptation.

The inventive algorithm is as follows:
1. Step 201: Performing similarity search on a feature vector, v, retrieving the K most similar results in the feature space. The similarity between v and u is measured by Eq 1. Set i=1;
2. Step 202: Initialize $X_1$ and $U_1$ to those vectors which are considered to be similar. Also initialize $Y_1$ and $V_1$ to those vectors that are not considered to be similar. If the number of vectors is less than a prescribed threshold, set $K = K + K_{inc}$, where $K_{inc}$ is a fixed increment, return to step 1;
3. Step 203: Perform query reformulation and learning (both of which will be described in detail later) based on two classes of vectors: $X_i$ and $Y_i$ where $X_i$ includes all the vectors that are considered similar (or relevant), while $Y_i$ include all the vectors that are considered to be not similar (or irrelevant). Consequently, the class label for $X_i$ is 1, while the class label for $Y_i$ is 2. The result of the learning will yield a transformation of the feature space, revised similarity metric, and relevance weighting of the features. The feature indices built based on the feature space before the transformation can still be used for the similarity retrievals in the next step;
4. Step 204: Perform similarity search in the transformed feature space using the revised query based on the revised similarity measure and revised relevance weighting for the features. The results are categorized to similar (or relevant) and dissimilar (or irrelevant). Assuming that $U_i$ and $V_i$ are the sets that include those similar and dissimilar vectors, respectively.
5. Step 205: Update $X_i$ and $Y_i$ as follows $X_i = X_{i-1} \cup U_i$, $Y_i = Y_{i-1} \cup V_i$.
6. Step 206: If the difference between $X_i$ and $X_{i-1}$ is less than a prescribed threshold, a equilibrium has been reached and exit.
7. Step 207: If the difference between $X_i$ and $X_{i-1}$ is greater than a prescribed threshold, the process is repeated for Set i=i+1 (return to step 3).

Figure 3:
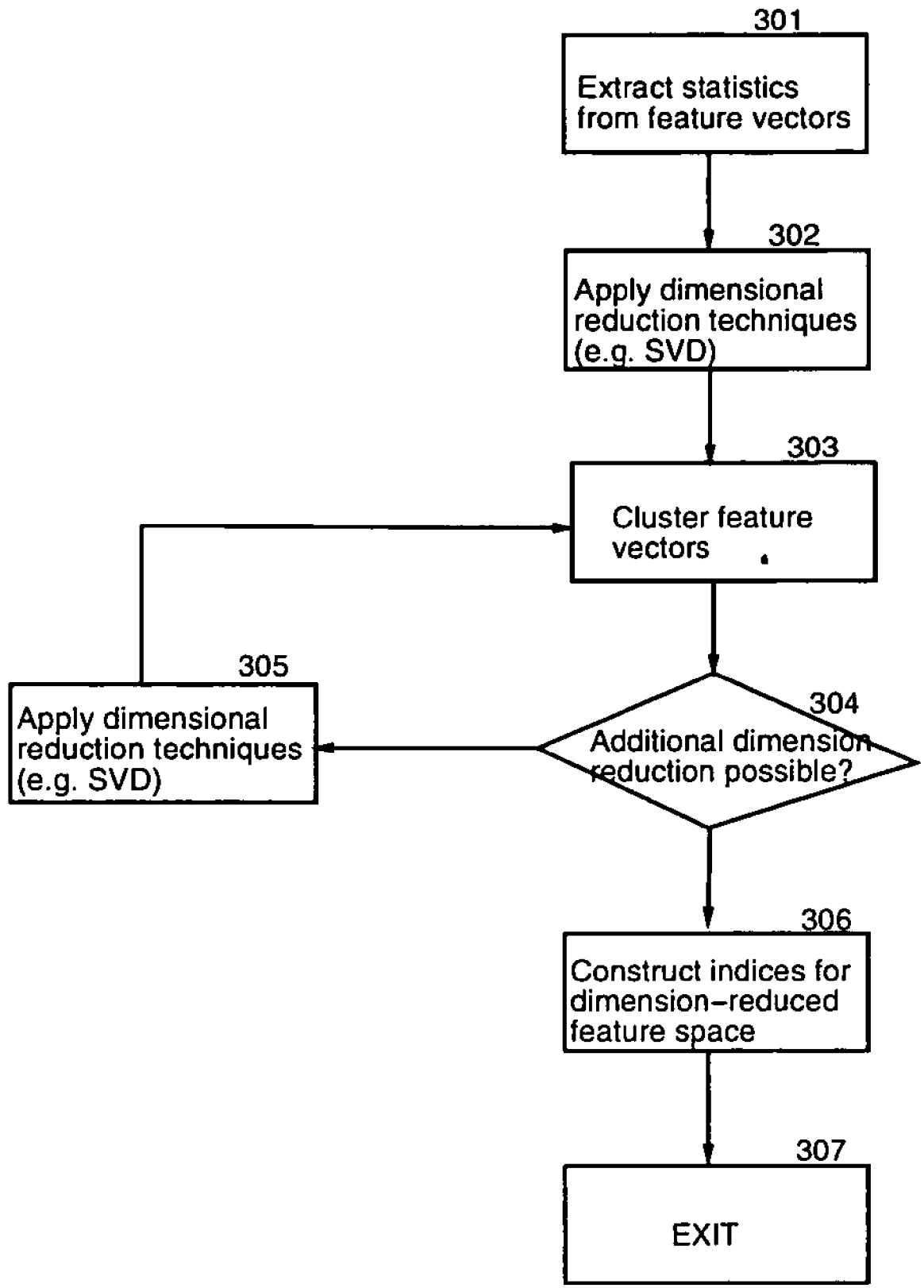
FIG. 3 shows the flowchart for building high dimensional indices to facilitate retrieval of high-dimensional feature vectors.

As mentioned earlier, an orthogonal but equally important issue is the capability of representing and retrieving the feature vectors efficiently. One possible approach, as illustrated in FIG. 3, depicts the process of generating the indices for retrieving feature vectors efficiently. In co-pending U.S. patent application, Ser. No. 960,540, filed Oct. 31, 1997, entitled "Multidimensional Data Clustering and Dimension Reduction for Indexing and Searching" by C.-S. Li, et al, an algorithm and an apparatus for generating efficient representation of the multidimensional information have been described. The statistics of the feature vectors in the dataset are computed (301). These statistics include, for example, the mean and variance of each dimension in the feature vector, which could include up to m dimensions. Singular value decomposition (SVD) (302) can then be applied to the feature vector. Singular value decomposition produces a transformation of the original feature space into a new feature space which has fewer dimensions while preserving the most prominent characteristics of the feature space. (Essentially, SVD generates a set of coordinate systems which aligns with the principle component axis of the original feature space.) However, additional space saving can come from clustering of the feature space (303), as each of the clusters potentially requires much fewer dimensions. Several clustering techniques, such as those described in the aforementioned application, can be applied here. After each clustering step, additional steps of SVD can be applied to see whether dimension reduction is still feasible (305). When there is no additional dimension reduction feasible, a high-dimensional indexing representation such as R-tree can be used to facilitate the indexing of these dimensional reduced feature vectors within each sub-cluster (306) before concluding the algorithm (307).

When performing a similarity retrieval, as required in step 201 and 204 of FIG. 2, the target vector is compared with the centroid or prototype of the clusters, depending on the type of clustering algorithm used in 303 of FIG. 3. As depicted in FIG. 4, one or more clusters are selected, at step (401), from the collection of clusters in terms of the similarity between the target vector and the centroid/prototype vectors of the clusters. The target vector will then go through the same dimension reduction process as the one used for generating the representation/indices of the multidimensional feature space (402). A total of N candidate vectors will be selected from these clusters (403). Note that these searches are based on the nearest neighbor principle. Consequently, the candidates selected in the similarity retrieval always have the closest distance (or best similarity measure) to the target vector. Also note that the nearest neighbor will always retrieve candidate vectors based on the distance/similarity measure between these vectors and the target vector. As a result, either the feature space needs to be reconfigured or the similarity measure needs to be adapted according to the user feedback, and this process is usually referred to as learning (as depicted in step 203 of FIG. 2).

In the following, the adaptation of query, similarity metric, weighting for individual features, and warping of the feature space, as depicted in step 203 of FIG. 2, are described:

(1) Reformulation of Query:

The initial query usually consists of one or more examples with each example represented by its corresponding feature vector. The reformulated query can be computed from these examples and counterexamples by, for example, computing the centroid and the range (or the statistical distribution such as standard deviation). During the iterative refinement process, feature vectors from new examples and counterexamples can be added to the ensemble of the feature vectors with different weights:

(2) Determination of Weightings for the Features:

The intuition is to emphasize those features that are well separated between examples and counterexamples, and/or have small variance within the examples (i.e., small spread of the distribution) as compared to the total distribution of the features, and de-emphasize those features that have poor separation between examples and counterexamples, and/or have large variance within examples (i.e., large spread of the distribution) as compared to the total distribution of the features within the database.

(3) Determining of the Similarity Measure:

This approach utilizes similarity measure such as the quadratic form $d(u, v)=(u-v)^T Q(u-v)$ where u and v have been defined earlier. Note that this metric can be formulated as a special case for the metric $d(u,v)=\|M(u-v)\|$, providing that the matrix Q can be decomposed into $M^T M$. The matrix Q allows the weighting of different features. A feature is assigned more weight if the feature is more discriminating than the others. Discriminating features can be determined form examples and counterexamples as described above. In general, the distance metric (also referred to as the $L_p$ distance) can be defined as $d(u, v)=(\Sigma_{i=1}^{n}(u-v_i)^2)^{1/p}$. The examples and counterexamples can be used to derive the optimal p by minimizing the distance within the same examples set (or counterexample set), and maximizing the distance between the examples set and the counterexample set.

(4) Feature Space Warping:

Feature space warping can be accomplished either through linear transformation, such as v'=L v, where v is a feature vector from the original feature space, while v' is a feature vector in the transformed (or warped) feature space. The matrix L is determined by a set of examples and counterexamples. Note that linear feature space warping is equivalent to feature weighting or similar measure selection. What is proposed in nonlinear feature space warping. Since linear feature space warping is a special case of nonlinear feature space warping, all of the discussion below will also apply to linear feature space warping.

The warping algorithm is based on the nonlinear multidimensional scaling method proposed by Web (A. R. Webb, "Multidimensional scaling by iterative majorization using radial basis functions," published in "Pattern Recognition," 28:753-759, 1995). The objective is to discover a transformation to transform all of the $x_i$'s in an n-dimensional vector space X to $y_i$'s in an m-dimensional vector space Y:

$$y_i = W^* \phi(x_i) \quad (2)$$

$$J=(1-\lambda)J_{se}+\lambda J_{sp} \quad (3)$$

is minimized. In Eq. (3), $J_{se}$ is a class separability criterion, and $J_{sp}$ is a structure preserving criterion, where W is an 1×m matrix, and $\phi(x_i)$ is a radial basis function where the ith component (i=1, . . . ,1) is defined as $$\phi(x) = \exp\left(-\frac{|x-c_i|^2}{h^2}\right) \quad (4)$$

The parameter $h^2$ is a bandwidth term where larger value gives rise to a smaller bandwidth. The vectors $c_i$ can be obtained from applying clustering algorithms such as K-means, Kohonen self-organization map or Tree-Structured Vector Quantizer (TSVQ) to generate l clusters from the dataset.

The class separability sums up the intraclass distance for all the pairs of vectors defined as below:

$$J_{se}=\Sigma_i\Sigma_j\epsilon(\omega_i, \omega_j)a_{ij}q_{ij}^2 \quad (5)$$

where $\omega_i$ and $\omega_j$ are the class labels of vector $x_i$ and $x_j$, and $$q_{ij}=|\eta(x_i)-\eta(x_j)|=|W^*(\phi(x_i)-\phi(x_j))| \quad (6)$$

The function $\delta(\omega_i, \omega_j)$ is defined as below:

$$\delta(\omega_i, \omega_j) = \begin{cases} 1 & \omega_i = \omega_j \\ 0 & \omega_i \neq \omega_j \end{cases} \quad (7)$$

$a_{ij}$'s are positive weights, defined as $$a_{ij} = \frac{1/d_{ij}(X)}{\sum_i \sum_j 1/d_{ij}(X)} \quad (8)$$

where $d_{ij}(X)$ is the Euclidean distance between $x_i$ and $x_j$ and can be defined as $$d_{ij}(X)=|x_i-x_j| \quad (9)$$

The structure preserving criterion is defined as below $$J_{sp}\Sigma_i\Sigma_j a_{ij}(q_{ij}-d_{ij}(X))^2 \quad (10)$$

It has been shown in Webb that the optimal solution W to Eq. (3) is the solution to the following equation:

$$AW=D(V)V \quad (1)$$

$$A=\Sigma_i\Sigma_j a_{ij}[(1-\lambda)\delta(\omega_i,\omega_j)+\lambda](\phi_i-\phi_j)(\phi_i-\phi_j)^* \quad (12)$$

$$D(V)=\Sigma_i\Sigma_j C_{ij}(V)(\phi_i-\phi_j)(\phi_i-\phi_j)^* \quad (13)$$

$$c_{ij}(V) = \begin{cases} a_{ij}d_{ij}(X)/q_{ij}(V) & (i, j) \in S_+ \\ 0 & (i, j) \in S_0 \end{cases} \quad (14)$$

Note that $S_+$ correspond to a set consisting of (i,j)'s which result in a $q_{ij}(V)$ greater than zero. On the other hand, $S_0$ correspond to the set which contains all the (i,j)'s that result in $q_{ij}(V)=0$.

The minimization of J will minimize the intraclass distance in the transformed space, while preserving the structure of the feature vectors. In many cases, the structure of an individual feature vector can be replaced by the structure of an individual cluster. The structure preserving term is essential in this framework. Without this term, a trivial solution W=0 will be able to minimize $J_{se}$.

The process of preparing the learning process based on the learning algorithm that has been described previously is depicted in FIG. 5. A subset of the feature vectors from the original feature space is selected (501). In principle, the entire set of feature vectors can be selected. However, a uniform sampling of the feature space can be adequate in many cases and may dramatically improve the speed of the subsequent clustering step. The centroids ($c_i$ in Eq. (4)) are then extracted by using one of the clustering algorithm mentioned above (502). In the experimental verification described below, Tree-structured Vector Quantization (TSVQ) is assumed due to its relative efficiency and accuracy as compared to other algorithms. If necessary, those matrices that are modified by the learning process can be precomputed (503).

Figure 6:
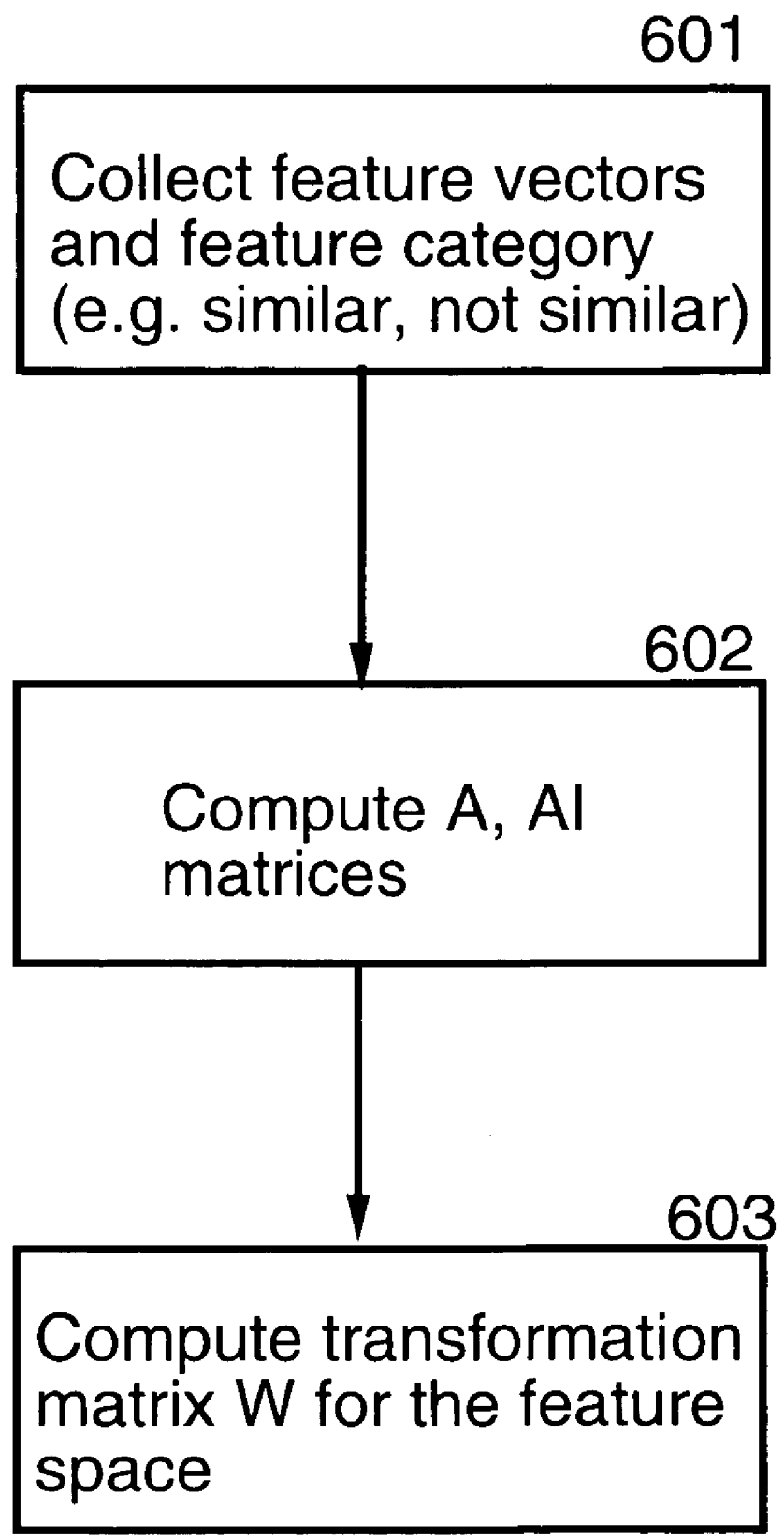
FIG. 6 shows the flowchart for computing linear transformation W for adjusting the feature space in order to improve the precision of the retrieval.

In the learning process referred to in step 203, each new learning iteration involves the selection of at least one new set of feature vectors that are considered relevant (referred to as $X_i$ in the iterative refinement algorithm) and a set of feature vectors that are considered irrelevant (referred to as $Y_i$ in the iterative refinement algorithm). FIG. 6 depicts the process of computing the transformation W once the relevant and irrelevant vectors are selected. If the ith vector is labeled as relevant, then $\omega_i=1$, else $\omega_i=0$ (601). This will enable the computation of the matrix A in Eq. (12), and consequently the inverse of A (602) (For numerical stability, Single Value Decomposition (SVD) is commonly used to compute the inverse of A). The necessary transformation W that can minimize the cost function J can then be computed based on Eq. (11) (603).

Note that there are a number of possible strategies for handling relevance feedback. The approach described in the algorithm treat all the feature vectors that are relevant with equally importance. Nevertheless, it is also possible to differentiate vectors during each iteration with different weights ($a_{ij}$ in Eq. (10) and Eq. (5)).

Figure 5:
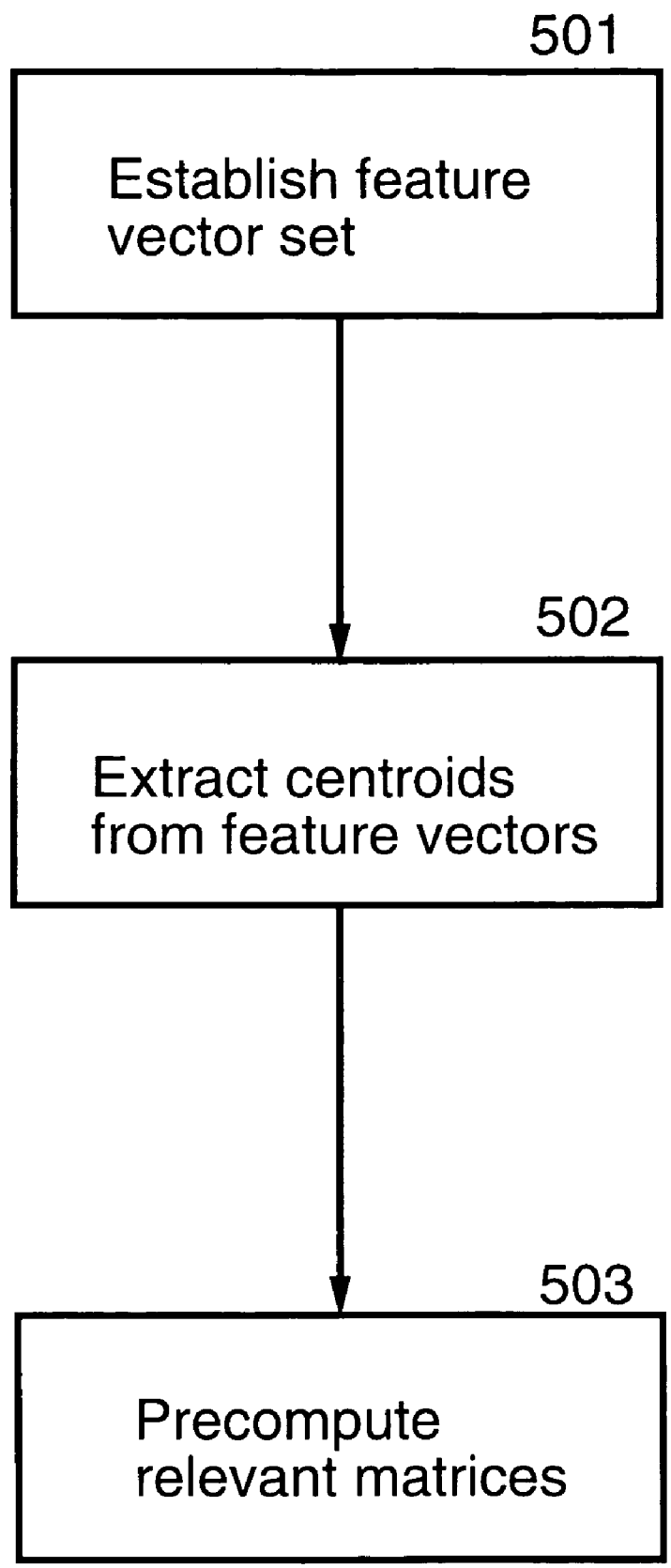
FIG. 5 shows the flowchart for selecting N clusters from the collections of the feature vectors that represent the user relevance feedback.

By comparing FIG. 5 with FIG. 3, it is to be noticed that both index preparation (303) and learning preparation (503) involve the clustering of the feature space. In principle, these steps can be done at the same time, and consequently share identical clustering structure. Therefore, a similarity retrieval in the transformed feature space (where the transformation is computed from the learning process) involves the computation of $$|y_2-y_1|=|W^*(\phi(x_2)-\phi(x_1)|$$

On the other hand, indices have been prepared for the vectors, $x_i$, that belongs to the i-th cluster:

$$z_i=V^*(\phi(x_i)).$$

where $\phi$ and V are determined using the same methodology outline above. According to the multidimensional indexing structure and the learning process, there exist four possible strategies for sharing the index construction process and learning preparation process:

Single-level multidimensional index structure with no additional dimension reduction in the learning: In this case, it is assumed that the multidimensional index is constructed after the original feature space has gone through the transformation $V^*\phi(x)$. The vector points in the transformed feature space are denoted as $z_i$, which is supposed to have fewer dimensions than the original feature space occupied by $x_i$. The similarity retrieval of those nearest neighbors to a vector in the feature space that has been adjusted through the learning algorithm described above is reduced to the computation of those $y_i$'s where $y_i$ is close to the target $y_c$. In other words, it is necessary to select those $y_i$'s such that the distance between these vectors and the target vector is smaller than that for any other candidates that are not selected. This can be formulated as follows:

$|y_i-y_c|=|UV^*(\phi(x_i)-\phi(x_c)|=|U(z_i-z_c)|$ where U is a square matrix derived from the relevance feedback process. When U is invertible (and thus $U^{-1}$ is nonsingular), it is possible to formulate similarity searches simply by using $z=U^{-1}y$ as the search target into the multidimensional indices built based on $V^*\phi(x)$. The additional overhead for doing similarity search using the new similarity measure is the computation of $z=U^{-1}y$.

Single-level multidimensional index structure with additional dimension reduction in the learning: In this case, it is assumed that the multidimensional index is constructed after the original feature space has gone through the transformation $V^*\phi(x)$. The vector points in the transformed feature space are denoted as $z_i$, which is supposed to have fewer dimensions than the original feature space occupied by $x_i$. The learning process may reduce the dimension further. These situations may arise due to the fact that a particular application may only need a subset of the original features. The similarity retrieval of those nearest neighbors to a vector in the feature space that has been adjusted through the learning algorithm described above is to compute those $y_i$'s where $y_i$ is close to the target $y_c$. In other words, it is necessary to select those $y_i$'s such that the distance between these vectors and the target vector is smaller than that for any other candidates that are not selected. This can be formulated as follows:

$|y_i-y_c|=|UV^*(\phi(x_i)-\phi(x_c)|=|U(z_i-z_c)|$ where U is a rectangular matrix derived from the relevance feedback process. Note that the matrix U is no longer invertible. Under such circumstance, the matrix U is first zero filled to have the same rank (or column dimensions) as the matrix $V^*$. The singular value decomposition technique can be applied to decompose the matrix U into $S\Gamma T$, where the diagonal elements of the matrix $\Gamma$ contains the singular values of the matrix U. Those singular values that are equal to zero are then replaced with a small but finite value $\epsilon$. The resulting matrix $S\Gamma T$ is then fully invertible, and the same technique can be applied as in the previous case to perform similarity search into indices built upon $V^*\phi(x)$.

Multi-level multidimensional indexing structure without additional dimension reduction due to learning: In this case, an algorithm such as RCSVD algorithm (as proposed in the aforementioned patent application) can be used. In the following discussion, it is assumed that the resulting structure is divided into three levels (the general case where there are a total of n levels can be easily extended). If the resulting structure is divided into three levels, the high dimensional index for the ijk-th subcluster (meaning this subcluster belongs to the i-th cluster at the 1st level, j-th subcluster at the 2nd level, and k-th subsubcluster at the third level) is computed based on $V_k^*V_j^*V_i^*\phi(x)$, where the transformation matrix $V_i^*$ is computed from the i-th cluster at level 1, and $V_j^*$ is computed from the j-th cluster at level 2, and $V_k^*$ is computed from the k-th cluster is computed from the k-th cluster at level 3. A vector in the subcluster is denoted as $z_i=V_k^*V_j^*V_i^*\phi(x)$. Under such circumstance, it is possible to confine the learning phase to $U_kV_k^*V_j^*V_i^*\phi(x)$, where the matrices $U_i$ is a square matrix. Consequently, a similarity retrieval in the new feature space (which has been transformed by $U_kV_k^*V_j^*V_i^*\phi(x)$) can be translated into the computation of $U_k^{-1}z_i$.

Multi-level multidimensional indexing structure with additional dimension reduction due to learning: In this case, an algorithm such as RCSVD algorithm (as proposed in the aforementioned patent application) can be used. In the following discussion, it is assumed that the resulting structure is divided into three levels (the general case where there are a total of n levels can be easily extended). If the resulting structure is divided into three levels, the high dimensional index for the ijk-th subcluster (meaning this subcluster belongs to the i-th cluster at the 1st level, j-th subcluster at the 2nd level, and k-th subsubcluster at the third level) is computed based on $V_k^* V_j^* V_i^* \phi(x)$, where the transformation matrix $V_i^*$ is computed from the i-th cluster at level 1, and $V_j^*$ is computed from the j-th cluster at level 2, and $V_k^*$ is computed from the k-th cluster is computed from the k-th cluster at level 3. A vector in the subcluster is denoted as $z_i = V_k^* V_j^* V_i^* \phi(x)$. Under such circumstances, it is possible to confine the learning phase to $U_k V_k^* V_j^* V_i^* \phi(x)$, where the matrices $U_i$ is a rectangular matrix. Note that the matrix U is no longer invertible. Under such circumstance, the matrix $U_i$ is first zero filled to have the same rank (or column dimensions) as the matrix $V^*$. The singular value decomposition technique can be applied to decompose the matrix $U_i$ into $S\Gamma T$ where the diagonal elements of the matrix $\Gamma$ contains the singular values of the matrix $U_i$. Those singular values that are equal to zero are then replaced with a small but finite value $\epsilon$. The resulting matrix $S\Gamma T$ is then fully invertible, and the same technique can then be applied as for the previous case to perform similarity search into indices built upon $V^* \phi(x)$.

In the following, the experimental results of the iterative refinement algorithm are described. The feature vector used in these experiments has 21 dimensions, consisting of spatial texture features such as fractal dimension, cooccurrence-based texture features, spatial gray level difference-based texture features, coarseness, skew, dispersion, and Moran circular correlation. The feature database is generated as follows: 32 random cuts of size 32×32 are generated from each of the 37 satellite images, each of which consist of homogeneous image regions. A 21-dimensional texture feature is then extracted from each random cut, resulting in a database consisting of a total of 1184 feature vectors. For each query, one of the random cuts from an image is used to retrieve the K most similar random cuts. The retrieved result is considered to be a hit if the retrieved random cut belongs to the same image as the original random cut. Note that the precision and recall values given in this section are all average values, using the precision and recall equations defined earlier. FIGS. 7 and 8 show examples of mountain, woods, forests, and suburban areas used in the 37 benchmark images.

To test the algorithm, the first K (K varies from 64 to 256) feature vectors are retrieved as samples and assigned class labels. Note that only two feature classes will be covered if K is equal to 64. The iterative refinement algorithm outlined in the previous section is then applied to the retrieved feature vectors together with its feature class. The resulting W is applied in conjunction with the radial basis function defined in the previous section to transform all the feature vectors in the database. A nearest neighbor search is then applied to determine the resulting precision and recall values.

FIG. 9 shows the precision versus recall for a given benchmark image before and after the iterative refinement algorithm is applied. In this case, the sample size is selected to be 256, the number of radial basis functions is chosen to be 20 (thus requiring the clustering function TSVQ to generate 20 clusters from 256 vectors), and the final feature vector space has 10 dimensions. The parameter h (in Eq.(4)) is set at 3.16 throughout the experiment. It is quite apparent that iterative refinement algorithm produced a significant improvement on the precision for a given recall, and vice versa. The improvement is greater for larger recall (or smaller precision).

To observe the impact from the parameter $\lambda$, $\lambda$ is varied from 0.2 to 0.8. Smaller $\lambda$ implies less emphasis on $J_{sp}$ and more emphasis on $J_{se}$, resulting in better class separability (See Eq. (10)). This is evident from FIG. 10, as lower $\lambda$ results in a better precision versus recall curve.

Larger initial sample size is important to the iterative refinement algorithm, as it requires a better global view of the entire database to determine the transformation. FIG. 11 shows that the precision versus recall performance dramatically deteriorates as the sample size is reduced from 256 to 64. Sampling techniques of the space can be applied and may produce a better training set for the iterative refinement algorithm.

The number of radial basis functions, and thus the number of clusters needed to be generated from the TSVQ clustering algorithm, also has an impact on the performance. As shown in FIG. 12, a point is reached when additional clusters will only fragment the feature space and do not really help to produce a good decomposition of the original vector space.

The additional bonus of using the nonlinear multi-dimensional scaling technique is the reduction of dimensionality. As shown in FIG. 13, the number of dimensions that are required for clean separation between the desirable and undesirable results is less than 5. Consequently, the precision versus recall curves are space fairly closely with respect to each other when the final number of dimensions is varied from 5 to 15.

Now that the invention has been described by way of a preferred embodiment, with alternatives, various modifications and improvements will occur to those of skill in the art. Thus, it should be understood that the detailed description should be construed as an example and not a limitation. The invention is properly defined by the appended claims.

What is claimed is:

1. A computerized method for retrieving multidimensional data from a database in response to a user query, comprising the steps of:
    a. extracting indices from said database;
    b. first searching said database to retrieve said multidimensional data based on said user query, wherein said searching is preceded by retrieving indices to focus said search on indexed information in said database;
    c. presenting retrieved multidimensional data to a user;
    d. receiving user input based on said retrieved multidimensional data;
    e. transforming said database based on said user input to generate a transformed database, wherein said transforming comprises at least one of modifying a linear transform matrix of said database, transforming feature space of the database, changing distance/similarity measures within said database, and changing weighting features within said database;
    f. successively searching said transformed database to retrieve said multidimensional data by applying said extracted indices to said transformed database; and
    g. repeating steps c through f until the user is satisfied with a result of said user query.

2. The method of claim 1 wherein said step of transforming said database further comprises reformulating the query based on said user input and wherein said searching said transformed database comprises searching said transformed database based on said reformulated query.

3. A program storage device readable by machine, embodying a program of instructions executable by the machine to perform method steps for retrieving multidimensional data from a database in response to a user query, said method steps comprising:
 a. extracting indices from said database;
 b. first searching said database to retrieve said multidimensional data based on said user query, wherein said searching is preceded by retrieving indices to focus said search on indexed information in the database;
 c. presenting retrieved multidimensional data to a user;
 d. receiving user input based on said retrieved data;
 e. transforming said database based on said user input to generate a transformed database, wherein said transforming comprises at least one of modifying a linear transform matrix of said database, transforming feature space of the database, changing distance/similarity measures within said database, and changing weighting features within said database;
 f. successively searching said transformed database to retrieve multidimensional data by applying said extracted indices to said transformed database; and
 g. repeating steps c through f until the user is satisfied with a result of said user query.

4. The device of claim 3 wherein said method steps of transforming said database further comprises reformulating the query based on said user input and wherein said searching said transformed database comprises searching said transformed database based on said reformulated query.

5. A system having at least a processor and a memory for retrieving multidimensional data from a database in response to a user query, comprising:
 said memory storing said database;
 a component for extracting indices from said database;
 a search component for first searching said database to retrieve multidimensional data based on said user query, wherein said searching is preceded by retrieving indices to focus said search on indexed information in the database;
 a presentation component for presenting retrieved data to a user;
 a receiver component for receiving user input based on said retrieved multidimensional data; and
 a transformation component for transforming said database based on said user input to generate a transformed database, wherein said transforming comprises at least one of modifying a linear transform matrix of the database, transforming feature space of the database, changing distance/similarity measures within said database, and changing weighting features within said database, wherein said system repeatedly searches said transformed database to retrieve multidimensional data by applying said extracted indices to said transformed database and to present retrieved data to the user until the user is satisfied with a result of said user query.

* * * * *